(12) United States Patent
Yamazaki et al.

(10) Patent No.: US 9,004,664 B2
(45) Date of Patent: Apr. 14, 2015

(54) INK JET RECORDING AQUEOUS PIGMENT INK

(75) Inventors: Soichi Yamazaki, Shiojiri (JP); Rie Miyazaki, Matsumoto (JP); Miharu Kanaya, Azumino (JP); Hiroshi Kato, Okaya (JP); Ayako Nishiki, Matsumoto (JP); Hideki Okada, Shiojiri (JP)

(73) Assignee: Seiko Epson Corporation, Suwa-shi (JP)

( * ) Notice: Subject to any disclaimer, the term of this patent is extended or adjusted under 35 U.S.C. 154(b) by 400 days.

(21) Appl. No.: 13/445,148

(22) Filed: Apr. 12, 2012

(65) Prior Publication Data

US 2012/0262516 A1    Oct. 18, 2012

(30) Foreign Application Priority Data

Apr. 14, 2011 (JP) ................ 2011-090165

(51) Int. Cl.
| | | |
|---|---|---|
| B41J 2/01 | (2006.01) | |
| B41J 2/175 | (2006.01) | |
| B41J 2/21 | (2006.01) | |
| C09D 11/322 | (2014.01) | |
| C09D 11/38 | (2014.01) | |

(52) U.S. Cl.
CPC ........... *B41J 2/17509* (2013.01); *B41J 2/2107* (2013.01); *C09D 11/322* (2013.01); *C09D 11/38* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ........... 347/100, 95, 96, 101, 102, 88, 99, 21, 347/20, 9; 106/31.6, 31.31, 31.27
See application file for complete search history.

(56) References Cited

U.S. PATENT DOCUMENTS

| | | | |
|---|---|---|---|
| 5,609,671 A | 3/1997 | Nagasawa | |
| 6,147,248 A | 11/2000 | Willms et al. | |
| 2003/0007051 A1* | 1/2003 | Takahashi et al. | ............ 347/100 |
| 2011/0234685 A1 | 9/2011 | Yamazaki et al. | |
| 2011/0234686 A1 | 9/2011 | Yamazaki et al. | |
| 2011/0234695 A1 | 9/2011 | Yamazaki et al. | |
| 2011/0236649 A1 | 9/2011 | Nishiki et al. | |
| 2011/0267398 A1* | 11/2011 | Hakiri et al. | ............ 347/20 |

FOREIGN PATENT DOCUMENTS

| | | |
|---|---|---|
| JP | 05-186704 A | 7/1993 |
| JP | 08-003498A A | 1/1996 |
| JP | 2000-513369 A | 10/2000 |

(Continued)

*Primary Examiner* — Manish S Shah
(74) *Attorney, Agent, or Firm* — Nutter McClennen & Fish LLP; John J. Penny, Jr.; Taylor M. Coon (57) ABSTRACT

An ink jet recording aqueous pigment ink contains a self-dispersing pigment, a quaternary amino acid, a non-polymeric, nonionic material having a melting point of 40° C. or more, and at least one of trialkylamine and trialkanolamine. The content of the non-polymeric, nonionic material is 3% to 15% by mass relative to the total mass of the ink jet recording aqueous pigment ink.

16 Claims, 1 Drawing Sheet

(56) References Cited

FOREIGN PATENT DOCUMENTS

| | | |
|---|---|---|
| JP | 2008-231132 A | 10/2008 |
| JP | 2011-201219 A | 10/2011 |
| JP | 2011-201220 A | 10/2011 |
| JP | 2011-202087 A | 10/2011 |
| JP | 2011-202088 A | 10/2011 |
| WO | WO 2010079670 A1 * 7/2010 | ............ C09D 11/00 |

* cited by examiner

INK JET RECORDING AQUEOUS PIGMENT INK

The entire disclosure of Japanese Application No.: 2011-090165 filed on Apr. 14, 2011 is expressly incorporated by reference herein.

BACKGROUND

1. Technical Field

The present invention relates to an ink jet recording aqueous pigment ink. More specifically, the invention relates to an ink jet recording aqueous pigment ink containing a self-dispersing pigment.

2. Related Art

Various techniques are applied in recording methods for forming images on a recording medium on the basis of image data signals. Among such techniques, the ink jet technique can efficiently use inks and accordingly reduce running costs because the ink jet technique can be used to form an image directly on a recording medium by ejecting ink onto only a desired image area. In addition, little noise is produced when the ink jet technique is used, and the ink jet technique is thus advantageous as a recording method.

Pigment inks that can be applied to various types of recording media and that are superior in waterfastness and light fastness are attracting attention as a type of ink for the ink jet technique. However, ink jet recording pigment inks have disadvantages in color reproduction range, print density, and reliability. Accordingly, in order to solve these disadvantages, ink jet recording aqueous pigment inks containing a self-dispersing pigment, which can disperse stably without using a dispersant, are being developed.

For example, JP-A-5-186704 discloses a self-dispersing carbon black whose surfaces have been modified so as to have a surface functional group by introducing the hydroxy group to the carbon black surfaces in a molar ratio of the hydroxy group to the quinone group of 10:1. JP-A-8-3498 discloses a method for producing a self-dispersing carbon black oxide powder surface-modified with active hydrogen. In this method, sodium hypochlorite is dropped into a mixture of an acid carbon black and water, and then the mixture is stirred at a temperature of 100 to 105° C. for 10 hours for demineralization and concentration. The resulting pigment dispersed liquid is treated with an acid, concentrated and dried to yield the self-dispersing carbon black powder surface-modified with active hydrogen.

Furthermore, JP-T-2000-513396 discloses a method for producing a surface-modified coloring pigment having a $C_6H_4SO_3^-Na^+$ group. In this method, a sodium nitrite solution is added to a mixture of a coloring pigment and a sulfanilic acid to prepare a pigment slurry. Then, hydrochloric acid is added to and mixed with the slurry at 70° C., followed by drying.

However, since inks, in general, contain various types of constituents and additives, such as a surfactant, an organic solvent and resin particles, the dispersion stability of the self-dispersing pigment can be degraded in the ink, and consequently, the pigment aggregates and forms sediment disadvantageously.

SUMMARY

Accordingly, an advantage of some aspects of the invention is that it provides an ink jet recording aqueous pigment ink that can suppress the sedimentation of the pigment resulting from aggregation, and that allows the self-dispersing pigment to disperse stably.

The present inventors have conducted intensive research to solve the above issues. As a result, the inventors found that an ink jet recording aqueous pigment ink containing a self-dispersing pigment, a quaternary amino acid, a predetermined amount of non-polymeric, nonionic material having a melting point of 40° C. or more, and at least either trialkylamine or trialkanolamine can solve the issues, and accomplished the invention.

According to an aspect of the invention, an ink jet recording aqueous pigment ink is provided.

[1] The ink jet recording aqueous pigment ink contains a self-dispersing pigment, a quaternary amino acid, a non-polymeric, nonionic material having a melting point of 40° C. or more, and at least one of trialkylamine and trialkanolamine. The content of the non-polymeric, nonionic material is 3% to 15% by mass relative to the total mass of the ink jet recording aqueous pigment ink.

[2] The quaternary amino acid may be trimethylglycine.

[3] The self-dispersing pigment may include at least one pigment selected from the group consisting of titanium oxide, inorganic pigments, organic pigments, metals, and resin particles.

[4] The non-polymeric, nonionic material may be at least one selected from the group consisting of glycerin fatty acid esters, 1,6-hexanediol, and trimethylolpropane.

[5] The ink jet recording aqueous pigment ink may further contain an acetylene glycol-based surfactant.

[6] According to another aspect of the invention, an ink jet recording apparatus is provided which includes an ink jet head that ejects the above-described ink jet recording aqueous pigment ink onto a recording medium, and that moves relative to the recording medium.

[7] The ink jet recording apparatus may further include an ink cartridge. The ink cartridge may be loaded on a carriage together with the ink jet head, or may be disposed separate from the carriage and connected to the ink jet head on the carriage with an ink supply tube.

[8] According to still another aspect of the invention, an ink jet recording method is provided which includes ejecting the ink jet recording aqueous pigment ink onto a recording medium from an ink jet head.

BRIEF DESCRIPTION OF THE DRAWINGS

The invention will be described with reference to the accompanying drawing, wherein like numbers reference like elements.

DESCRIPTION OF EXEMPLARY EMBODIMENTS

Figure 1:
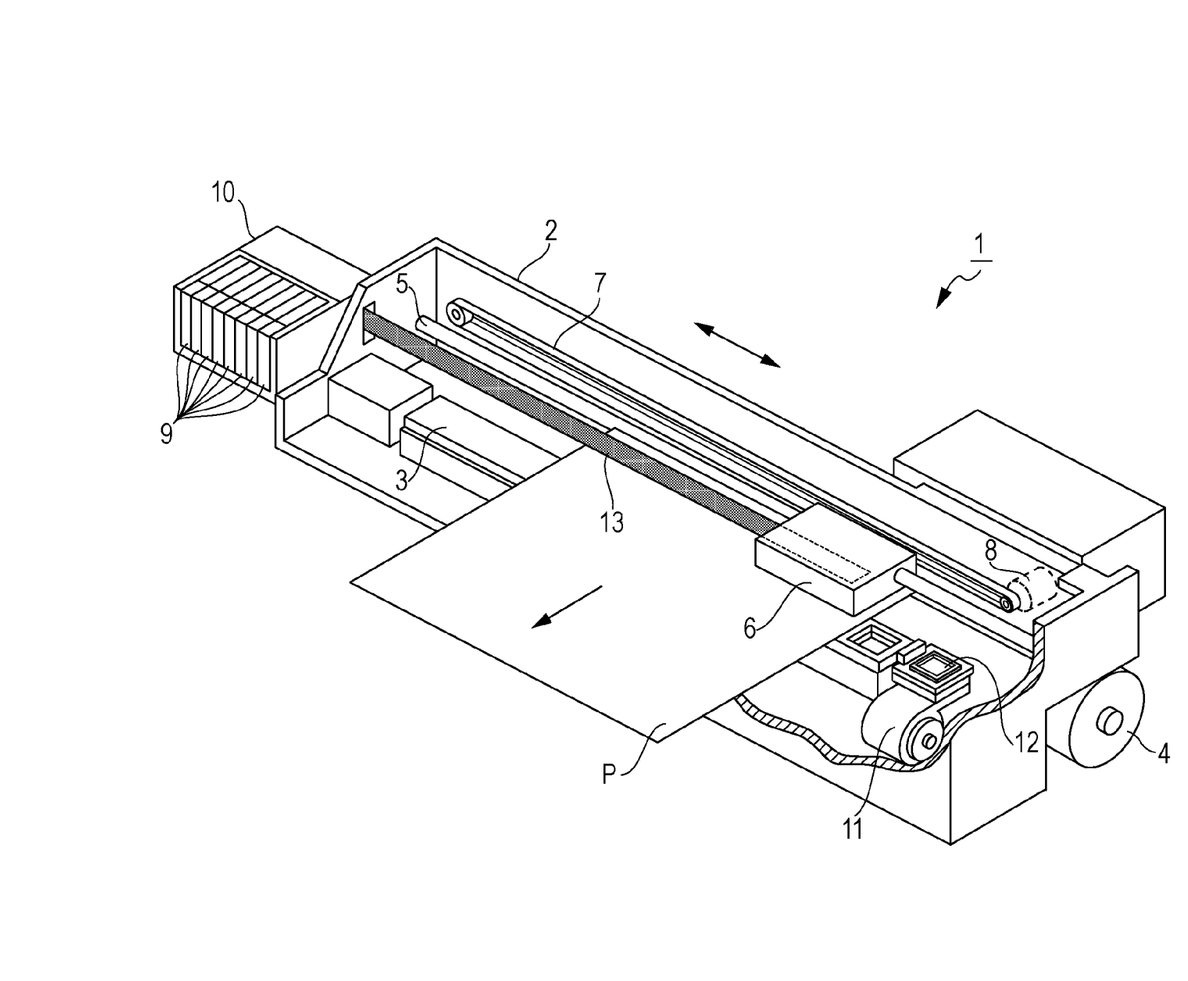
The FIGURE is a perspective view of a printer according to an embodiment of the invention.

Embodiments of the invention will now be described in detail. The invention is not limited to the following embodiments, and various modifications may be made within the scope and spirit of the invention.

In the specification, the term "dispersion stability" refers to the property of dispersing solid particles in a liquid to form a stable suspension. The term "ejection stability" refers to the property of stably ejecting ink droplets through nozzles without nozzle clogging.

Ink Jet Recording Aqueous Pigment Ink

An ink jet recording aqueous pigment ink according to an embodiment of the invention contains a self-dispersing pigment, a quaternary amino acid, a predetermined amount of non-polymeric, nonionic material having a melting point of 40° C. or more (hereinafter may be referred to as specific material in some cases), and at least one of trialkylamine and trialkanolamine.

Constituents that are contained in or can be added to the ink jet recording aqueous pigment ink will now be described.

Self-dispersing Pigment

The ink jet recording aqueous pigment ink of the present embodiment contains a self-dispersing pigment. The self-dispersing pigment is a pigment whose surfaces have been modified by binding a group that can impart dispersibility (hereinafter referred to as dispersibility-imparting group, at least one of hydrophilic functional groups and their salts) to the surfaces of the pigment particles. This surface modification allows the self-dispersing pigment to disperse stably in an aqueous solvent without using a dispersant.

The material of the self-dispersing pigment is preferably at least one selected from the group consisting of titanium oxide, inorganic pigments, organic pigments, metals, and resin particles.

In addition to titanium oxide, other ceramics, such as iron oxide, may be used.

Exemplary inorganic pigments include carbon blacks (C.I. Pigment Black 7), such as furnace black, lampblack, acetylene black, and channel black.

Exemplary organic pigments include insoluble azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

More specifically, exemplary inorganic or organic pigments include, but are not limited to, C.I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180 and 198, C.I. Pigment Reds 1, 3, 5, 8, 9, 16, 17, 19, 22, 38, 57:1, 90, 112, 122, 123, 127, 146, 184, 202 and 209, C.I. Pigment Violets 1, 3, 5:1, 16, 19, 23 and 38, C.I. Pigment Blues 1, 2, 15, 15:1, 15:2, 15:3, 15:4 and 16, and C.I. Pigment Black 1.

Exemplary metals include white pigments, such as barium sulfate and calcium carbonate; and metallic pigments of silver, gold, platinum, nickel, chromium, tin, zinc, indium, titanium, or copper.

The resin particles may be hollow resin particles. A known type can be used as hollow resin particles without particular limitation. For example, the hollow resin particles disclosed in U.S. Pat. No. 4,880,465 or Japanese Patent No. 3,562,754 can be suitably used.

The ink jet recording aqueous pigment ink of the present embodiment can suppress the sedimentation of the pigment resulting from aggregation, and is thus superior in stably dispersing the self-dispersing pigment. Accordingly, the ink jet recording aqueous pigment ink is significantly advantageous when the material of the ink jet recording aqueous pigment ink has a relatively large specific gravity like ceramics or metals.

The self-dispersing pigment can be prepared by binding a dispersibility-imparting group to the surfaces of the pigment particles directly or with, for example, an alkyl, alkyl ether or aryl group therebetween. Thus the self-dispersing pigment prepared from the material pigment disperses or dissolves in an aqueous solvent in the absence of a dispersant.

From the viewpoint of enhancing the storage stability of the ink and preventing nozzle clogging, the average particle size of the self-dispersing pigment is preferably 50 to 250 nm. The average particle size mentioned herein refers to a sphere-equivalent 50% average particle size (d50) measured by a light scattering method, and can be obtained by the following procedure.

Particles in a disperse medium are irradiated with light, and the diffracted/scattered light from the particles is measured with detectors disposed in the front, side and back of the disperse medium. With the assumption that particles, which are naturally indefinite in shape, are spherical, an accumulation curve is obtained from the measurement results, wherein the total volume of the spherical particles calculated from the volumes of measured particles is 100%, and the point where the cumulative value is 50% is defined as the sphere-equivalent 50% average particle size (d50) by a light scattering method. A laser diffraction/scattering particle size analyzer LMS-2000e (manufactured by Seishin Enterprise Co., Ltd.) may be used for the diffracted/scattered light measurement.

Some self-dispersing black pigments are commercially available, and two are available from Cabot. Examples of commercially available self-dispersing black pigments include CAB-O-JET 200 (sulfonated carbon black) and CAB-O-JET 300 (carboxylated carbon black), each available from Cabot Corporation; and Bonjet Black CW-1 available from Orient Chemical Industries Co., LTD.)

Examples of the dispersibility-imparting group bound to the surfaces of the self-dispersing pigment particles include, but are not limited to, carboxyl (—COOH), ketone (—CO), hydroxy (—OH), sulfonate (—SO$_3$H), phosphate (—PO$_3$H$_2$), quaternary ammonium, and groups in the form of a salt of these groups. These dispersibility-imparting groups may be made unstable by a constituent (particularly, a polar material) in the ink jet recording aqueous pigment ink.

The present inventors found that a quaternary amino acid and a predetermined amount of the above-mentioned specific material form a coating layer over the surfaces of the particles of the self-dispersing pigment, thereby stabilizing the self-dispersing pigment (enhancing the dispersion stability). The present inventors think that by adding a quaternary amino acid and a predetermined amount of the specific material to the ink jet recording aqueous pigment ink, capsules that can suppress the sedimentation of the self-dispersing pigment are formed around the self-dispersing pigment particles. In addition, the inventors believe that the self-dispersing pigment used in the embodiment is substantially a pseudo-microencapsulated pigment having a capsule structure in a functional sense. The "capsule structure" mentioned above refers to a structure in which the quaternary amino acid and a predetermined amount of the specific material form a coating layer over the surfaces of the self-dispersing pigment particles, and the "functional sense" mentioned above means that the self-dispersing pigment whose surfaces are covered with the coating layer has high dispersion stability. However, in general, a microcapsule refers to a relatively hard capsule made of a polymer, a wax, or an inorganic material. In the present embodiment, a capsule structure is formed by the formation of the coating layer of the self-dispersing pigment, and this contributes to the increase in dispersibility. However, the coating layer is made of a non-polymeric material and is not hard. Hence, the self-dispersing pigment is not a microencapsulated pigment in a precise sense. It can be said that the self-dispersing pigment of the present embodiment is pseudo-microencapsulated.

It has been known that a protective colloid, such as India ink glue or milk casein, covers a colloid to stabilize the colloid. However, in this technique, the colloid is covered with a macromolecule, and the macromolecule undesirably increases the viscosity of the solvent. It is therefore not advantageous to use a protective colloid produced from a macromolecule to stabilize the pigment. As a result of intensive study, the present inventors came up with the idea that an ionic quaternary amino acid and a predetermined amount of the specific material form a stable layered structure around the particles of the self-dispersing pigment, and that the layered structure functions as a protective colloid to pseudo-microencapsulate the self-dispersing pigment. By adding such a pseudo-microencapsulated self-dispersing pigment to an ink, the layered structure functioning as a protective collide enhances the dispersion stability of the pigment without increasing the viscosity of the solvent.

Also, the pseudo-microencapsulated self-dispersing pigment of the present embodiment can produce a low-viscosity, ejection-stable ink even if it is added in a high concentration.

In addition, the self-dispersing pigment has a high dispersion stability and does not easily aggregate to cause sedimentation. Accordingly, the self-dispersing pigment enhances the storage stability of the ink effectively. Furthermore, the ink jet recording aqueous pigment ink containing a pseudo-microencapsulated pigment allows the pigment to disperse stably and exhibits superior color developability on recording media.

A self-dispersing pigment may be used singly, or two or more self-dispersing pigments may be used in combination.

The content of the self-dispersing pigment is 2% to 15% by mass, preferably 5% to 12% by mass, relative to the total mass (100% by mass) of the ink jet recording aqueous pigment ink. If the content is 2% by mass or more, the print density becomes satisfactory, and the resulting ink exhibits good color developability. If the content is 15% by mass or less, the ink does not clog nozzles and exhibits high ejection stability.

Quaternary Amino Acid

The ink jet recording aqueous pigment ink of the present embodiment contains a quaternary amino acid. The quaternary amino acid includes a quaternary ammonium ion having four substituted or unsubstituted alkyl groups as an amino group. The quaternary amino acid has characteristics of ions and non-polymeric materials.

The quaternary amino acid functions to adjust pH, to keep moisture, and to suppress the curling of recording media, as with the other amino acids. In addition to these functions, the quaternary amino acid is more chemically stable than tertiary amino acids, secondary amino acids and primary amino acids, and is suitable for storing the ink stably for a long time.

Examples of the quaternary amino acid include, but are not limited to, trimethylglycine, N,N,N-trimethylalanine, N,N,N-trimethylglutamic acid, and triethylglycine.

Trimethylglycine, which has the lowest molecular weight of the four, is preferred. By adding trimethylglycine as the quaternary amino acid together with the specific material that will be described below to the ink jet recording aqueous pigment ink, the particles of the self-dispersing pigment are coated with a thick layer and thus enhance the dispersion stability.

A commercially available quaternary amino acid AMINOCOAT (registered trademark, trimethylglycine, produced by Asahi Kasei Chemicals Corporation) may be preferably used.

A quaternary amino acid may be used singly, or two or more quaternary amino acids may be used in combination.

The quaternary amino acid content is preferably 1% to 30% by mass, more preferably 4% to 20% by mass, relative to the total mass (100% by mass) of the ink jet recording aqueous pigment ink. The quaternary amino acid in an amount in the above range can cooperate with the below-described specific material (non-polymeric, nonionic material having a melting point of 40° C. or more) to form a layer on the particles of the self-dispersing pigment, thus enhancing the dispersion stability of the self-dispersing pigment.

Non-polymeric, Nonionic Material Having a Melting Point of 40° C. or More (Specific Material)

The ink jet recording aqueous pigment ink of the present embodiment contains a non-polymeric, nonionic material having a melting point of 40° C. or more (specific material). Preferably, this specific material is soluble in water.

The temperature of ink jet inks used in piezoelectric heads may increase to about 40° C. during continuous printing. Therefore, capsules need to be formed at a temperature as high as 40° C. In order to form a firm capsule layer, it is required that the specific material have a melting point of 40° C. or more.

If a polymeric material is dispersed in an ink, the viscosity of the ink is increased, and accordingly, the ejection stability of the ink is degraded. Therefore, a non-polymeric material is used.

The specific material used in the present embodiment satisfies all of the above requirements. The ink jet recording aqueous pigment ink, which contains such a specific material, is particularly suitable for piezoelectric ink jet recording.

Examples of the specific material include, but are not limited to, glycerin fatty acid esters, 1,6-hexanediol, and trimethylolpropane. It is preferable to select at least one from among glycerin fatty acid esters, 1,6-hexanediol and trimethylolpropane. These materials easily form a hydrophobic bond with the hydrophobic group of the quaternary amino acid and can easily cooperate with the quaternary amino acid to form a coating layer.

The specific material content is 3% to 15% by mass, preferably 4% to 10% by mass, relative to the total mass (100% by mass) of the ink jet recording aqueous pigment ink. When the specific material content is in such a range, the dispersion stability of the pigment and the ejection stability of the ink can be enhanced.

It will be described below why the self-dispersing pigment exhibits high dispersion stability in the ink jet recording aqueous pigment ink.

Since a quaternary amino acid includes a hydrophobic group and two hydrophilic groups, carboxyl and amino, it can be easily attached to the rough surfaces of the self-dispersing pigment. If a quaternary amino acid is attached to the surfaces of the self-dispersing pigment, the carboxyl and amino groups increase the zeta ($\zeta$) potential of the self-dispersing pigment, and thus increases the degree of repulsion of charged pigment particles. Consequently, the self-dispersing pigment can be stably dispersed. If an amine, described below, is present at this time, the negative charging of the surfaces of the self-dispersing pigment particles is promoted, and the adsorption of the amine and the quaternary amino acid is advanced.

The non-polymeric, nonionic material having a melting point of 40° C. or more forms a firmer layer in the vicinity of the hydrophobic group of the quaternary amino acid (for example, the methyl group of trimethylglycine) than materials that are liquid at room temperature, and thus enhances the dispersion stability of the pigment. The content of this non-polymeric, nonionic material is adjusted so that firm capsules can be formed and so that ejection failure can be prevented.

Thus, by adding an amine, a quaternary amino acid, and a predetermined amount of the non-polymeric, nonionic material to the ink jet recording aqueous pigment ink, the self-dispersing pigment has the same function as microencapsulated pigments. This function suppresses the sedimentation of the pigment resulting from aggregation, and consequently, the self-dispersing pigment exhibits good dispersion stability.

Amine

The ink jet recording aqueous pigment ink of the present embodiment contains an amine.

In view of the reason why the ink jet recording aqueous pigment ink allows the self-dispersing pigment to disperse stably in the ink, any amine can be added as long as it is basic. The present inventors found that the nitrogen of the amine promotes the adsorption of the nitrogen of the quaternary amino acid to the surfaces of the self-dispersing pigment particles, and thus helps the formation of a firm capsule structure that can enhance the dispersion stability.

The amine is preferably a tertiary amine even if it is a weak base. More preferably, the amine is at least one of trialkylamines and trialkanolamines, having high flash points and low odor. Trialkylamines and trialkanolamines are ionic and non-polymeric.

Exemplary trialkylamines include, but are not limited to, triethylamine and tripropylamine. Exemplary trialkanolamines include, but are not limited, triethanolamine and triisopropanolamine.

The trialkylamines and trialkanolamines may be used singly or in combination.

The total content of trialkylamines and trialkanolamines is preferably 0.01% to 2% by mass relative to the total mass (100% by mass) of the ink jet recording aqueous pigment ink. The amine in such an amount can function to adjust pH and help the quaternary amino acid form a capsule structure effectively.

Surfactant

The ink jet recording aqueous pigment ink of the present embodiment may contain a surfactant. The surfactant is preferably nonionic. More preferably, it is an acetylene glycol-based surfactant. By adding an acetylene glycol-based surfactant to the ink jet recording aqueous pigment ink, the quaternary amino acid can be adsorbed to the self-dispersing pigment without inhibition, and consequently, the self-dispersing pigment can exhibit high dispersion stability in the ink jet recording aqueous pigment ink.

This is probably because nonionic surfactants having a three-dimensional structure, but not a straight chain structure, such as acetylene glycol-based surfactants, are more difficult to attach to the self-dispersing pigment than the quaternary amino acid.

Acetylene glycol-based surfactants, which are nonionic surfactants having a symmetrical structure having an acetylene group at the center of the structure, have the functions of wetting, defoaming and dispersing, and are used in various aqueous materials as antifoaming wetting agents. In addition, since acetylene glycol-based surfactants are glycols having a very stable molecular structure with a low molecular weight and have the effect of reducing the surface tension of water, the penetration or bleeding of the ink to recording media can be appropriately controlled.

If the ink jet recording aqueous pigment ink is controlled so that the quaternary amino acid is not inhibited from adsorbing to the pigment in addition to containing the quaternary amino acid and a predetermined amount of the non-polymeric, nonionic material in combination, the aggregation of the pigment can further be suppressed, and accordingly, the self-dispersing pigment is extremely superior in dispersion stability.

Exemplary acetylene glycol-based surfactants include, but are not limited to, 2,4,7,9-tetramethyl-5-decyne-4,7-diol, 3,6-dimethyl-4-octyne-3,6-diol, and 3,5-dimethyl-1-hexyne-3-ol.

Commercially available acetylene glycol-based surfactants include Surfynol 104 series, surfynols 420, 440, 465, 485 and 104, and STG (each produced by Air Products and Chemicals Inc.), Olfines STG, PD-001, SPC, E1004 and E1010 (each produced by Nissin Chemical Industry Co., Ltd.), and Acetylenols E00, E40, E100 and LH (each produced by Kawaken Fine Chemicals Co., Ltd.)

These acetylene glycol-based surfactants may be used singly or in combination.

The content of acetylene glycol-based surfactant is preferably 0.1% to 3.0% by mass, more preferably 0.3% to 2.0% by mass, relative to the total mass (100% by mass) of the ink jet recording aqueous pigment ink. If the acetylene glycol-based surfactant content is in the above range, the feel of gloss and the penetration of the ink can be appropriate.

Water

The ink jet recording aqueous pigment ink of the present embodiment contains water as the main solvent. The water may be pure water such as ion exchanged water, ultrafiltered water, reverse osmotic water, or distilled water, or ultrapure water. Preferably, the water is sterilized by being irradiated with UV light or adding hydrogen peroxide or the like to prevent mold or bacteria from growing and thus make it possible to store the ink for a long time.

Other Additives

The ink jet recording aqueous pigment ink of the present embodiment may contain other additives. Additives that may be contained in the ink jet recording aqueous pigment ink will be described below.

The ink jet recording aqueous pigment ink may contain a pH adjuster. Examples of the pH adjuster include alkali metal hydroxides, such as lithium hydroxide, potassium hydroxide, and sodium hydroxide; and ammonia and amines other than trialkylamines and trialkanolamines, such as diethanolamine and monoethanolamine. In addition, a pH buffer may be used, such as collidine, imidazole, phosphoric acid, 3-(N-morpholino)propanesulfonic acid, tris(hydroxymethyl)aminomethane, and boric acid, if necessary.

These pH adjusters may be used singly or in combination. The pH adjuster content may be 0.01% to 2% by mass relative to the total mass (100% by mass) of the ink jet recording aqueous pigment ink.

In order to prevent the ink jet head from being clogged in the vicinity of the nozzles, the ink jet recording aqueous pigment ink may contain a water-soluble organic solvent (wetting agent) for wetting or moisturizing. Examples of the wetting agent include polyhydric alcohols, such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, and 2-methyl-2,4-pentanediol; saccharides, such as glucose, mannose, fructose, ribose, xylose, arabinose, galactose, aldonic acid, glucitol (sorbitol), maltose, cellobiose, lactose, sucrose, trehalose, and maltotriose; solid wetting agents, such as sugar alcohols, hyaluronic acids, and ureas; alkyl alcohols having a carbon number of 1 to 4, such as ethanol, methanol, butanol, propanol, and isopropanol; amino acids, such as pyrrolidone carboxylic acid, aspartic acid, glycine, proline, and betaine; and 2-pyrrolidone, N-methyl-2-pyrrolidone, 1,3-dimethyl-2-imidazolidinone, formamide, acetamide, dimethyl sulfoxide, sorbitol, a sorbitan, acetin, diacetin, triacetin and sulfolane. The wetting agents (moisturizing agent) include the above-described quaternary amino acid.

Wetting agents may be used singly or in combination. In order to ensure appropriate properties (for example, viscosity) of the ink, good printing quality, and reliability, the wetting agent content is preferably 5% to 50% by mass relative to the total mass (100% by mass) of the ink jet recording aqueous pigment ink.

The ink jet recording aqueous pigment ink may contain a preservative or antifungal agent. Preservatives and antifungal agents include disodium ethylenediaminetetraacetate (EDTA-2Na), sodium benzoate, sodium pentachlorophenol, sodium-2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN, each produced by Avecia).

These preservatives and antifungal agents may be used singly or in combination. The content of preservatives and antifungal agents is preferably 0.001% to 1% by mass relative to the total mass (100% by mass) of the ink jet recording aqueous pigment ink.

In order to promote the penetration of the aqueous solvent to recording media, the ink jet recording aqueous pigment ink may further contain a penetration enhancer. By rapid penetration of the aqueous solvent into the recording medium, a recorded article in which bleeding does not occur in images can be produced. Examples of such a penetration accelerator include alkyl ethers of polyhydric alcohols (glycol monoalkyl ethers) and 1,2-alkyldiols. Exemplary glycol monoalkyl ethers include propylene glycol monobutyl ether, dipropylene glycol monobutyl ether, diethylene glycol monobutyl ether, and triethylene glycol monobutyl ether (TEGmBE). Exemplary 1,2-alkyldiols include 1,2-pentanediol and 1,2-hexanediol.

Penetration enhancers may be used singly or in combination. The penetration enhancer content can be 1% to 15% by mass relative to the total mass (100% by mass) of the ink jet recording aqueous pigment ink.

The ink jet recording aqueous pigment ink may contain an antioxidant (ultraviolet absorber). Examples of the antioxidant (ultraviolet absorbent) include allophanates, such as allophanate and methyl allophanate; biurets, such as biuret, dimethyl biuret, and tetramethyl biuret; L-ascorbic acid and its salts; Tinuvins 328, 900, 1130, 384, 292, 123, 144, 622, 770 and 292, Irgacors 252 and 153, and Irganoxes 1010, 1076, 1035 and MD1024 (each produced by Ciba-Geigy), and lanthanide oxides.

These antioxidants (ultraviolet absorbents) may be used singly or in combination.

In addition, an antifoaming agent and other additives may be added to the ink jet recording aqueous pigment ink.

The ink jet recording aqueous pigment ink prepared as above suppresses the sedimentation of the pigment resulting from aggregation and allows the self-dispersing pigment to disperse stably.

Ink Jet Recording Apparatus

An ink jet recording apparatus according to an embodiment of the invention performs recording by ejecting an ink from an ink jet head while the ink jet head is moving relative to the recording medium, but is otherwise not limited. The ink jet recording apparatus may be a line printer whose ink jet head or print head moves negligibly when recording, or a serial printer that performs recording while the ink jet head is moving in a direction perpendicular to the direction in which the recording medium is transported. The serial printer may be of on-carriage type or off-carriage type. In the on-carriage type, the ink cartridge (ink tank) and the ink jet head are loaded on a carriage together. In the off-carriage type, the ink cartridge is disposed separate from the carriage and connected to the ink jet head with a tube.

An off-carriage type serial printer (hereinafter simply referred to as printer) will now be described as an embodiment of the ink jet recording apparatus of the invention, with reference to the FIGURE. For ease of recognition, the dimensional proportions of the members and components in the FIGURE are changed as needed.

The FIGURE is a perspective view of a printer 1 according to an embodiment of the invention. As shown in the FIGURE, the printer 1 includes a flame 2 provided with a platen 3, a paper feed motor 4, and a guide bar 5. A recording medium P is fed over the platen 3 by the operation of the paper feed motor 4.

The guide bar 5 holds the carriage 6 so that the carriage 6 can move reciprocally in the axis direction of the guide bar 5. The carriage 6 is connected to the carriage motor 8 through a timing belt 7 disposed within the frame 2.

The carriage 6 contains an ink jet head (not shown). The ink jet head ejects the ink jet recording aqueous pigment ink of an embodiment of the invention onto the recording medium P. The ink jet head is preferably of piezoelectric type from the viewpoint of affinity with the ink jet recording aqueous pigment ink.

The ink cartridge 9 may be disposed separate from the carriage 6. For example, the ink cartridge 9 may be accommodated in a cartridge housing 10 disposed outside the printer 1 (outside of the range of moving the carriage). In this instance, the ink cartridge 9 and the carriage 6 are connected with an ink supply tube 13. The ink cartridge 9 does not move together with the carriage 6.

A cap 11 prevents nozzles from being clogged by drying. A cleaner 12 sucks nozzles if the nozzles are clogged. Therefore, the cleaner 12 includes a suction device, such as a pump, and may be called a suction unit or a cleaning box.

If an additional large-volume ink tank is provided outside the printer 1, the large-volume ink tank and the ink cartridge 9 are connected with an ink replenishing tube. Thus, in the off-carriage type printer 1, the store volume of the ink jet recording aqueous pigment ink can be greatly increased, as in on-carriage type printers.

Ink Jet Recording Method

An ink jet recording method according to an embodiment of the invention includes ejecting the ink jet recording aqueous pigment ink. In the ink jet recording method, an ink jet recording apparatus as shown in the FIGURE feeds a recording medium P over the platen 3 by the operation of the paper feed motor 4. Over the platen 3, the carriage 6 is reciprocally moved along the guide bar 5 in the directions of the arrow shown in the FIGURE by the operation of the carriage motor 8.

In the step of ejecting the ink, the ink jet recording aqueous pigment ink is ejected to the recording medium P. For example, the ink jet recording aqueous pigment ink in the ink cartridge 9 is supplied to the ink jet head for the ink jet recording aqueous pigment ink from the ink cartridge 9 by the operation of a piezoelectric element (not shown) of the ink jet head. The ink jet recording aqueous pigment ink is ejected through nozzles formed in the nozzle face of the ink jet head onto the recording medium P fed over the platen 3. Thus, an ink layer (not shown) is formed on the recording medium P.

In addition to the ejecting step, the ink jet recording method includes heating the recording medium on which the ink jet recording aqueous pigment ink has been deposited.

The ink jet recording aqueous pigment ink contains water as a disperse medium, and dries rapidly after it is ejected. Accordingly, the drying step is not necessarily required. However, the heating step can prevent the liquid component of the ink jet recording aqueous pigment ink from remaining in the resulting recorded article even if the recording medium can retain water or the ink jet recording aqueous pigment ink contains a liquid component having a low volatility in a high proportion. Thus, the heating step enhances the durability and reliability of the resulting recorded article.

According to the above two embodiments, an ink jet recording apparatus and an ink jet recording method are provided which are suitable for performing recording using the ink jet recording aqueous pigment ink that suppresses the sedimentation of the pigment resulting from aggregation and allows the ink jet recording aqueous pigment ink to disperse stably.

EXAMPLES

The ink jet recording aqueous pigment ink of the above-described embodiment will be further described in detail with reference to Examples and Comparative Examples, but the invention is not limited to the Examples.

Materials Used
Pigment Dispersions
    CAB-O-JET300 (product name, produced by Cabot Corporation, solid content: 15%)
    BONJET BLACK CW-1 (product name, produced by Orient Chemical Industries Co., LTD., pigment content: 20%)
    NanoTek® Slurry (product name, produced by C.I. Kasei, average particle size: 36 nm, titanium oxide slurry)
Quaternary Amino Acid
    Trimethylglycine (betaine anhydride, produced by Tokyo Chemical Industry Co., Ltd.)
Primary Amino Acid
    Glycine (produced by Tokyo Chemical Industry Co., Ltd.)
    Non-polymeric, Nonionic Materials Having a Melting Point of 40° C. or More
    1,6-Hexanediol (Tokyo Chemical Industry Co., Ltd., melting point: 42° C.)
    Glycerin fatty acid ester (Rheodol MS-50 (product name), produced by Kao Corporation, melting point: 55 to 60° C.)
    Trimethylolpropane (produced by Tokyo Chemical Industry Co., Ltd., melting point: 58° C.)
Materials Having a Melting Point of 40° C. or More The non-polymeric, nonionic material having a melting point of 40° C. or more is simply shown as a material having a melting point of 40° C. or more in Table 1.
    1,2-Hexanediol (produced by Tokyo Chemical Industry Co., Ltd.)
    1,5-Pentanediol (produced by Tokyo Chemical Industry Co., Ltd.)
    1,3-Propanediol (produced by Tokyo Chemical Industry Co., Ltd.)
    Glycerin (produced by Tokyo Chemical Industry Co., Ltd.)
    Triethylene glycol monobutyl ether (Tokyo Chemical Industry Co., Ltd.) (TEGmBE in Table 1)
Surfactant
    2-Ethyl-1,3-hexanediol (produced by Tokyo Chemical Industry Co., Ltd.)
    Olfine E1010 (produced by Nissin Chemical Co., Ltd., acetylene glycol-based surfactant)
    Surfynol 104 (produced by Air Products, acetylene glycol-based surfactant)
    PF-151N (fluorochemical surfactant, produced by OMNOVA)
Amines
    Triethanolamine (produced by Tokyo Chemical Industry Co., Ltd.)
    Triisopropanolamine (produced by Tokyo Chemical Industry Co., Ltd.)
pH Adjuster
    Potassium hydroxide (KOH)
Preservatives/Antifungal Agents
    Disodium ethylenediaminetetraacetate (EDTA-2Na)
    Proxel XL-2 (product name, produced by Avecia, 1,2-benzisothiazolin-3-one)
Water
    Ion exchanged water
Preparation of Pigment Ink Materials were mixed in the amounts shown in Table 1, and stirred at room temperature for 2 hours. Then, the mixture was filtered through a membrane filter having a pore size of 5 µm. Thus, the ink jet recording aqueous pigment inks of Examples 1 to 5 and Comparative Examples 1 to 14 were prepared.

In Table 1, the content of each material is shown on a percent-by-mass (mass %) basis, and the pigment dispersion content is shown on a solid basis. No entry (blank) means that the corresponding material was not added. Ion exchanged water was added to make a total of 100% by mass.

TABLE 1

| Ink composition | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Pigment | CAB-O-JET300 | 6 | | | 8 | | 6 | | | 6 | | |
| | BONJET BLACK CW-1 | | 8 | | | | | 8 | | | 8 | |
| | NanoTek(R)Slurry | | | 6 | | 6 | | | 6 | | | 6 |
| Quaternary amino acid | Trimethylglycine | 8 | 10 | 10 | 16 | 7 | 10 | 15 | 8 | | | |
| Primary amino acid | Glycine | | | | | | | | | | | 10 |
| Material having a melting point of 40° C. or more | 1,6-Hexanediol | 6 | | 3 | 8 | 5 | | | | 8 | | |
| | Glycerin fatty acid ester | | 3 | | | 5 | | | | | 12 | |
| | Trimethylolpropane | | | 6 | 7 | | | | | | | 8 |

TABLE 1-continued

| | | | | | | | | | | | |
|---|---|---|---|---|---|---|---|---|---|---|---|
| Material having a melting point of less than 40° C. | 1,2-Hexanediol | 1 | | | | 6 | | | | | |
| | 1,5-Pentanediol | | 2 | | | | 6 | | | | |
| | 1,3-Propanediol | | | | | | | 6 | | | |
| | Glycerin | 2 | | 5 | | 5 | 5 | | | 2 | |
| | TEGmBE | | | | 2 | 2 | 2 | | 2 | 2 | |
| Surfactant | 2-Ethyl-1,3-hexanediol | | | | | | | | | | |
| | Olfine E1010 | 0.5 | 0.5 | 1 | 0.5 | | 0.5 | | 0.5 | 0.5 | 0.5 | 0.5 |
| | Surfynol 104 | | | | 0.3 | 0.3 | | 0.3 | | | |
| | PF-151N | | | | | | | | | | |
| Amine | Triethanolamine | 0.7 | | 0.5 | | | 0.7 | | | 0.7 | |
| | Triisopropanolamine | | 0.7 | | 0.3 | 0.7 | | 0.7 | 0.7 | | 0.7 | 0.5 |
| pH adjuster | KOH | | | | | | | | | | |
| Preservative/ antifungal agent | EDTA | | 0.02 | | 0.02 | | 0.02 | | 0.02 | 0.02 | |
| | Proxel XL-2 | | 0.3 | | 0.3 | | 0.3 | | 0.3 | 0.3 | |

| | Ink composition | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|
| Pigment | CAB-O-JET300 | 8 | | | 8 | 8 | | | 8 |
| | BONJET BLACK CW-1 | | | 6 | | | 6 | 6 | |
| | NanoTek(R)Slurry | | 6 | | | | | | |
| Quaternary amino acid | Trimethylglycine | 10 | 12 | 8 | 8.5 | 8.5 | 8 | 8 | 8.5 |
| Primary amino acid | Glycine | | | | | | | | |
| Material having a melting point of 40° C. or more | 1,6-Hexanediol | | | | 2 | | | | 27.5 |
| | Glycerin fatty acid ester | 8 | | | | 2 | | 18 | |
| | Trimethylolpropane | | | 5 | 5 | | 16 | | |
| Material having a melting point of less than 40° C. | 1,2-Hexanediol | | | | 2 | | | | |
| | 1,5-Pentanediol | 2 | | | | | | | |
| | 1,3-Propanediol | | | | | | | | |
| | Glycerin | | | 3 | | | 3 | 3 | |
| | TEGmBE | 2 | | | | 2 | | | |
| Surfactant | 2-Ethyl-1,3-hexanediol | | | 2 | | | | | 2 |
| | Olfine E1010 | 0.5 | | | | 0.5 | | | |
| | Surfynol 104 | | 0.5 | | | | 0.5 | 0.5 | |
| | PF-151N | | | | 0.5 | | | | 0.5 |
| Amine | Triethanolamine | | | | | | 0.5 | 0.5 | |
| | Triisopropanolamine | | | | | 0.5 | | | |
| pH adjuster | KOH | 0.05 | | | | | | | |
| Preservative/ antifungal agent | EDTA | | 0.02 | 0.02 | | | 0.02 | 0.02 | |
| | Proxel XL-2 | | 0.3 | 0.3 | | | 0.3 | 0.3 | |

Each ink jet recording aqueous pigment ink shown in Table 1 was evaluated as below.

Increase in Pigment Particle Size

The resulting ink was diluted with pure water so that the pigment concentration (mass %) was reduced to 1/1000. At this time, it was checked whether a coating layer was formed, by measuring the average particle size with Microtrac UPA 150. If the layer was formed, it can be thought that pseudo-microcapsules were formed.

The evaluation of the increase in the average particle size of the pigment is shown as "particle size increase" in Table 2. The evaluation criteria were as follows, and the results are shown in Table 2:

Good: The average particle size of the pigment was increased to 6 nm or more, and it is thought that a thick layer was formed.

Fair: The average particle size was increased to 2 nm or more and less than 6 nm, and it is thought that a layer was formed.

Bad: The average particle size was increased to less than 2 nm, and it is not thought that a layer was formed.

Centrifugal Sedimentation Rate

The ink was centrifuged at 10,000 rpm for 16 minutes with a centrifuge DR20B21 manufactured by Himac. The supernatant liquid was diluted 4,000 times, and the absorbance of the liquid was measured with a spectrophotometer HITACHI U-3300. The rate of change in absorbance was evaluated as the sedimentation rate. The evaluation criteria were as follows, and the results are shown in Table 2:

Good: Sedimentation rate<15%

Fair: 15%≤Sedimentation rate<25%

Bad: Sedimentation rate≥25%

Ejection Stability

The ink placed in the cartridge of an ink jet printer PX-500 produced by EPSON was ejected while the ejection speed was observed with an ink jet ejection observation apparatus "Dot View" (manufactured by TRYTECH). The evaluation criteria were as follows, and the results are shown in Table 2:

Good: Ink ejection speed≥7 m/s

Bad: Ink ejection speed<7 m/s

TABLE 2

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Centrifugal sedimentation rate | Good | Good | Good | Good | Good | Bad | Bad | Bad | Bad | Bad | Bad |
| Particle size increase | Good | Good | Good | Good | Good | Fair | Fair | Fair | Bad | Bad | Bad |
| Ejection stability | Good | Good | Good | Good | Good | Good | Good | Good | Good | Good | Good |

|  | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Centrifugal sedimentation rate | Fair | Fair | Bad | Bad | Bad | Fair | Fair | Bad |
| Particle size increase | Fair | Fair | Bad | Fair | Fair | Good | Good | Bad |
| Ejection stability | Good | Good | Good | Good | Good | Bad | Bad | Bad |

As is clear from the results shown in Table 2, the inks containing a self-dispersing pigment, a quaternary amino acid, a non-polymeric, nonionic material having a melting point of 40° C. or more in an amount in a predetermined range, and an amine (inks of the Examples) exhibited more remarkable increases in the average particle size of the pigment and more remarkable decreases in centrifugal sedimentation rate than the other inks (inks of the Comparative Examples). In addition, the ejection speeds of the inks of the Examples were more than or equal to those of the inks of the Comparative Examples.

What is claimed is:

1. An ink jet recording aqueous pigment ink comprising:
a self-dispersing pigment;
a quaternary amino acid; and
a non-polymeric, nonionic material having a melting point of 40° C. or more; and at least one of a trialkylamine or a trialkanolamine,
wherein the non-polymric, nonionic material having a melting point of 40° C. or more is at least one selected from the group consisting of glycerin fatty acid esters, and trimethylopropane, and is present in an amount of 3% to 15% by mass relative to the total mass of the ink jet recording aqueous pigment ink.

2. The ink jet recording aqueous pigment ink according to claim 1, wherein the quaternary amino amino acid is trimethylglycine.

3. The ink jet recording aqueous pigment ink according to claim 1, wherein the self-dispersing pigment includes at least one pigment selected from the group consisting of titanium oxide, inorganic pigments, organic pigments, metals, and resin particles.

4. The ink jet recording aqueous pigment ink according to claim 1, further comprising an acetylene glycol-based surfactant.

5. An ink jet recording apparatus comprising:
an ink jet head that ejects the ink jet recording aqueous pigment ink as set forth in claim 1 onto a recording medium and moves relative to the recording medium.

6. An ink jet recording apparatus comprising:
an ink jet head that ejects the ink jet recording aqueous pigment ink as set forth in claim 2 onto a recording medium and moves relative to the recording medium.

7. An ink jet recording apparatus comprising:
an ink jet head that ejects the ink jet recording aqueous pigment ink as set forth in claim 3 onto a recording medium and moves relative to the recording medium.

8. An ink jet recording apparatus comprising: an ink jet head that ejects the ink jet recording aqueous pigment ink as set forth in claim 4 onto a recording medium and moves relative to the recording medium.

9. The ink jet recording apparatus according to claim 5, further comprising an ink cartridge, wherein the ink jet head is loaded on a carriage, and the ink cartridge is loaded on the carriage together with the ink jet head or is disposed separate from the carriage and connected to the ink jet head with an ink supply tube.

10. The ink jet recording apparatus according to claim 6, further comprising an ink cartridge, wherein the ink jet head is loaded on a carriage, and the ink cartridge is loaded on the carriage together with the ink jet head or is disposed separate from the carriage and connected to the ink jet head with an ink supply tube.

11. The ink jet recording apparatus according to claim 7, further comprising an ink cartridge, wherein the ink jet head is loaded on a carriage, and the ink cartridge is loaded on the carriage together with the ink jet head or is disposed separate from the carriage and connected to the ink jet head with an ink supply tube.

12. The ink jet recording apparatus according to claim 8, further comprising an ink cartridge, wherein the ink jet head is loaded on a carriage, and the ink cartridge is loaded on the carriage together with the ink jet head or is disposed separate from the carriage and connected to the ink jet head with an ink supply tube.

13. An ink jet recording method comprising ejecting the ink jet recording aqueous pigment ink as set forth in claim 1 onto a recording medium from an ink jet head.

14. An ink jet recording method comprising ejecting the ink jet recording aqueous pigment ink as set forth in claim 2 onto a recording medium from an ink jet head.

15. An ink jet recording method comprising ejecting the ink jet recording aqueous pigment ink as set forth in claim 3 onto a recording medium from an ink jet head.

16. An ink jet recording method comprising ejecting the ink jet recording aqueous pigment ink as set forth in claim 5 onto a recording medium from an ink jet head.

* * * * *